(12) United States Patent
Dunn

(10) Patent No.: US 9,382,093 B2
(45) Date of Patent: Jul. 5, 2016

(54) STRUCTURAL CYLINDER WITH CONFORMABLE EXTERIOR

(71) Applicant: Souhegan Wood Products, Inc., Wilton, NH (US)

(72) Inventor: Randolph A. Dunn, Wilton, NH (US)

(73) Assignee: SOUHEGAN WOOD PRODUCTS, INC., Wilton, NH (US)

( * ) Notice: Subject to any disclaimer, the term of this patent is extended or adjusted under 35 U.S.C. 154(b) by 295 days.

(21) Appl. No.: 14/077,617

(22) Filed: Nov. 12, 2013

(65) Prior Publication Data

US 2014/0070046 A1    Mar. 13, 2014

Related U.S. Application Data

(62) Division of application No. 13/009,304, filed on Jan. 19, 2011.

(60) Provisional application No. 61/296,139, filed on Jan. 19, 2010, provisional application No. 61/305,204, filed on Feb. 17, 2010.

(51) Int. Cl.
*B65H 75/10* (2006.01)
*B29C 63/06* (2006.01)
*B32B 7/12* (2006.01)
(Continued)

(52) U.S. Cl.
CPC ............... *B65H 75/10* (2013.01); *B29C 63/06* (2013.01); *B32B 7/12* (2013.01); *B32B 21/08* (2013.01); *B32B 21/14* (2013.01); *B32B 27/04* (2013.01); *B32B 27/10* (2013.01); *B32B 27/12* (2013.01); *B32B 27/20* (2013.01); *B29K 2101/10* (2013.01); *B32B 2262/067* (2013.01); *B32B 2307/7246* (2013.01); *B32B 2307/7265* (2013.01);
(Continued)

(58) Field of Classification Search
CPC ............... B65H 75/10; B65H 2701/51; Y10T 428/1348; Y10T 428/1303; B29C 63/06; B29K 2101/10; B32B 7/12; B32B 21/08; B32B 21/14; B32B 27/04; B32B 27/10; B32B 27/12; B32B 27/20; B32B 2262/067; B32B 2307/7246; B32B 2307/7265
See application file for complete search history.

(56) References Cited

U.S. PATENT DOCUMENTS 503,227 A    8/1893    Benham
1,015,244 A    1/1912    Parker
(Continued)

FOREIGN PATENT DOCUMENTS

EP    0605914 A1    7/1994
EP    0747205 A2    12/1996
(Continued)

OTHER PUBLICATIONS

Office Action dated Jul. 21, 2010 for U.S. Appl. No. 12/328,800, 6 pgs.
(Continued)

*Primary Examiner* — Michael C Miggins
(74) *Attorney, Agent, or Firm* — Maine Cernota & Rardin

(57) ABSTRACT

A method is provided for the production of structural cylinder with a wound material shell, the method comprising: providing a extruded wood core cylinder; wrapping a flexible material about an exterior surface of the cylinder; applying an adhesive between the interior of the material and the exterior profile of the core; allowing the adhesive to cure providing a structural cylinder with a wrapped material exterior.

11 Claims, 7 Drawing Sheets

(51) Int. Cl.
*B32B 21/08* (2006.01)
*B32B 21/14* (2006.01)
*B32B 27/04* (2006.01)
*B32B 27/10* (2006.01)
*B32B 27/12* (2006.01)
*B32B 27/20* (2006.01)
*B29K 101/10* (2006.01)

(52) U.S. Cl.
CPC ....... *B65H2701/51* (2013.01); *Y10T 428/1303* (2015.01); *Y10T 428/1348* (2015.01)

(56) References Cited

U.S. PATENT DOCUMENTS

| | | | |
|---|---|---|---|
| 1,753,342 A | 4/1930 | Hubbard | |
| 1,881,911 A | 10/1932 | Parker | |
| 2,365,980 A | 12/1944 | Pacific | |
| 2,748,805 A | 6/1956 | Winstead | |
| 2,977,066 A | 3/1961 | Kimmel | |
| 3,447,996 A | 6/1969 | Himmelheber et al. | |
| 3,807,458 A | 4/1974 | Royston | |
| 4,034,932 A | 7/1977 | Ferch | |
| 4,157,181 A | 6/1979 | Cecka | |
| 4,179,269 A | 12/1979 | Yates et al. | |
| 4,361,530 A | 11/1982 | Peer | |
| 4,701,373 A | 10/1987 | Fuchs et al. | |
| 4,810,255 A | 3/1989 | Fay, III et al. | |
| 4,980,214 A * | 12/1990 | Charriere | B29C 61/006 264/342 R |
| 5,147,722 A | 9/1992 | Koslow | |
| 5,585,155 A | 12/1996 | Heikkila et al. | |
| 6,007,656 A | 12/1999 | Heikkila et al. | |
| 6,083,601 A | 7/2000 | Prince et al. | |
| 6,106,944 A | 8/2000 | Heikkila et al. | |
| 6,319,457 B1 | 11/2001 | DuCharme, Jr. et al. | |
| 7,270,279 B2 | 9/2007 | Monk | |
| 7,357,726 B2 | 4/2008 | Thorning | |
| 2002/0094431 A1 | 7/2002 | Roderick et al. | |
| 2004/0126515 A1* | 7/2004 | Yarmoska | B27N 3/28 428/34.1 |
| 2005/0015986 A1 | 1/2005 | Stebnicki et al. | |
| 2005/0049329 A1 | 3/2005 | Faulkner | |
| 2005/0133951 A1 | 6/2005 | Muller et al. | |
| 2008/0156234 A1 | 7/2008 | van de Camp | |
| 2009/0110842 A1 | 4/2009 | Vinden et al. | |
| 2009/0145994 A1 | 6/2009 | Dunn | |
| 2009/0264560 A1* | 10/2009 | Warnes et al. | B27N 1/00 524/13 |
| 2010/0236172 A1 | 9/2010 | Wirth | |

FOREIGN PATENT DOCUMENTS

| | | |
|---|---|---|
| EP | 1250995 A1 | 10/2002 |
| GB | 723426 A | 2/1955 |
| GB | 901519 A | 7/1962 |
| GB | 1 471 181 | 4/1977 |
| JP | 08-090691 | 4/1996 |
| JP | 11-309704 | 11/1999 |
| JP | 2000-034802 | 2/2000 |
| JP | 2002-115701 | 4/2002 |

OTHER PUBLICATIONS

Office Action dated Dec. 28, 2009 for U.S. Appl. No. 12/328,800, 6 pgs.

"Bushblock Fuel Logs Help the Cheetah's Cause", CCF Bush Party, Ltd, retrieved online, <www.cheetah.org/?nd=ccf_bush_Project>, retrieved on Oct. 1, 2010, 5 pages.

"FM200 Floor Back and Side Wrap" retrieved on internet <www.cheaponsale.com/d-p11216434113935>, retrieved on Oct. 1, 2010, 3 pages.

"Penta Profiles Furniture Components", retrieved from internet <www.pentaprofiles.com/about-us.htm> retrieved on Oct. 1, 2010, 1 page.

PCT Search Report dated Sep. 29, 2011 of Patent Application No. PCT/US2011/021675 filed Jan. 19, 2011.

* cited by examiner

STRUCTURAL CYLINDER WITH CONFORMABLE EXTERIOR

RELATED APPLICATIONS

This application is a divisional of U.S. patent application Ser. No. 13/009,304, filed Jan. 19, 2011 which claims the benefit of U.S. Provisional Applications No. 61/296,139, filed Jan. 19, 2010, and No. 61/305,204, filed Feb. 17, 2010. Each of these applications is herein incorporated by reference in their entirety for all purposes.

FIELD OF THE INVENTION

The invention relates to extruded wood cores, and more particularly, to an extruded wood core with a reinforcing web disposed about the exterior of said score.

BACKGROUND OF THE INVENTION

Wood fiber cores have been used in applications utilized for winding or spooling industrial products. Extruded wood fiber cores, such as those manufactured by the assignee since the mid 1960's, have been suitable for applications where low cost is valued, and where durability is not essential. Wood fiber cores have excellent compressive strength in the axial direction, but only moderate or poor tensile strength in the transverse direction. Such fiber cores may be extruded or molded. Wood fiber cores are typically limited to single use as they lack beam strength, and unwinding of materials from the core can produce cracks, fissures or other structural defects rendering them inoperative.

Solid wood cores are manufactured using labor intensive machining of lumber, gluing, clamping and various steps. While more expensive than extruded core, the solid wood provides improved structural integrity for heavier materials or multiple use applications. Such solid wood cores are of particular value in intracompany uses. Such solid wood cores have improved beam strength.

Similarly, the steel cores are highly durable, but require expensive fabrication and welding, are heavy, and are expensive to ship.

What is needed, therefore, are techniques for providing durable, reusable cylinders manufacturable with low labor.

SUMMARY OF THE INVENTION

One embodiment of the present invention provides a method for the production of structural cylinder with a wound material shell, the method including: providing a extruded wood core cylinder; wrapping a flexible material about an exterior surface of the cylinder; applying an adhesive between the interior of the flexible material and the exterior profile of the core; allowing the adhesive to cure providing a structural cylinder with a wrapped material exterior.

Another embodiment of the present invention provides such a method wherein the flexible material is a sheet of flexible material.

A further embodiment of the present invention provides such a method further comprising application of a plurality of layers of the material.

Still another embodiment of the present invention provides such a method wherein the material is paper.

A still further embodiment of the present invention provides such a method wherein the flexible material is selected from the group of flexible materials consisting of: fiber glass, composites, and textiles.

Yet another embodiment of the present invention provides such a method wherein the flexible material is preferentially applied to parts of the extruded wood core cylinder such that the structural cylinder has a non-cylindrical profile exterior.

A yet further embodiment of the present invention provides such a method wherein the profile exterior comprises a parabolic frustrum.

Even another embodiment of the present invention provides such a method further comprising applying a finish layer.

One embodiment provides a structural unit, the structural unit including: a extruded core comprising wood fiber and a thermoset resin having a central hole coaxial with a major axis of the core and an exterior and a plurality of layers of settable material forming a shell, disposed about the exterior of the core.

Another embodiment of the present invention provides such a structural unit further comprising a finish layer.

A further embodiment of the present invention provides such a structural unit wherein the finish layer comprises a wood veneer.

Still another embodiment of the present invention provides such a structural unit wherein the finish layer comprises a simulated veneer.

A still further embodiment of the present invention provides such a structural unit wherein the finish layer comprises a plaster skim coat.

Yet another embodiment of the present invention provides such a structural unit wherein the finish layer comprises a patterned paper.

A yet further embodiment of the present invention provides such a structural unit wherein the settable material is selected from the group of settable materials consisting of coated paper, fiberglass, composites, rubber, synthetic rubber, silicon based polymers, vinyl, elastic polymers, inelastic polymers, and coated textiles.

Even another embodiment of the present invention provides such a structural unit further comprising a water and moisture impenetrable barrier enlacing the structural unit.

Even another embodiment of the present invention provides such a structural unit wherein the water and moisture impenetrable barrier comprises a heat shrunk polymeric layer.

Still yet another embodiment of the present invention provides a structural unit wherein the water and moisture impenetrable barrier comprises a stretch wrap polymeric layer.

A still yet further embodiment of the present invention provides a structural unit wherein the plurality of layers of settable material comprises overlapping layers of preformed tubular segments and adhesive.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

In one embodiment of the present invention a core 12 is disposed within a shell 14 forming a structural unit 10. The central core is provided having an extruded wood fiber core comprising wood fiber and a resin extruded in a cylindrical or other desired elongate form. Such a core is analogous to that used in U.S. application Ser. No. 12/328,800 of the same inventor. This application is hereby incorporated by reference for all purposes.

Figure 1:
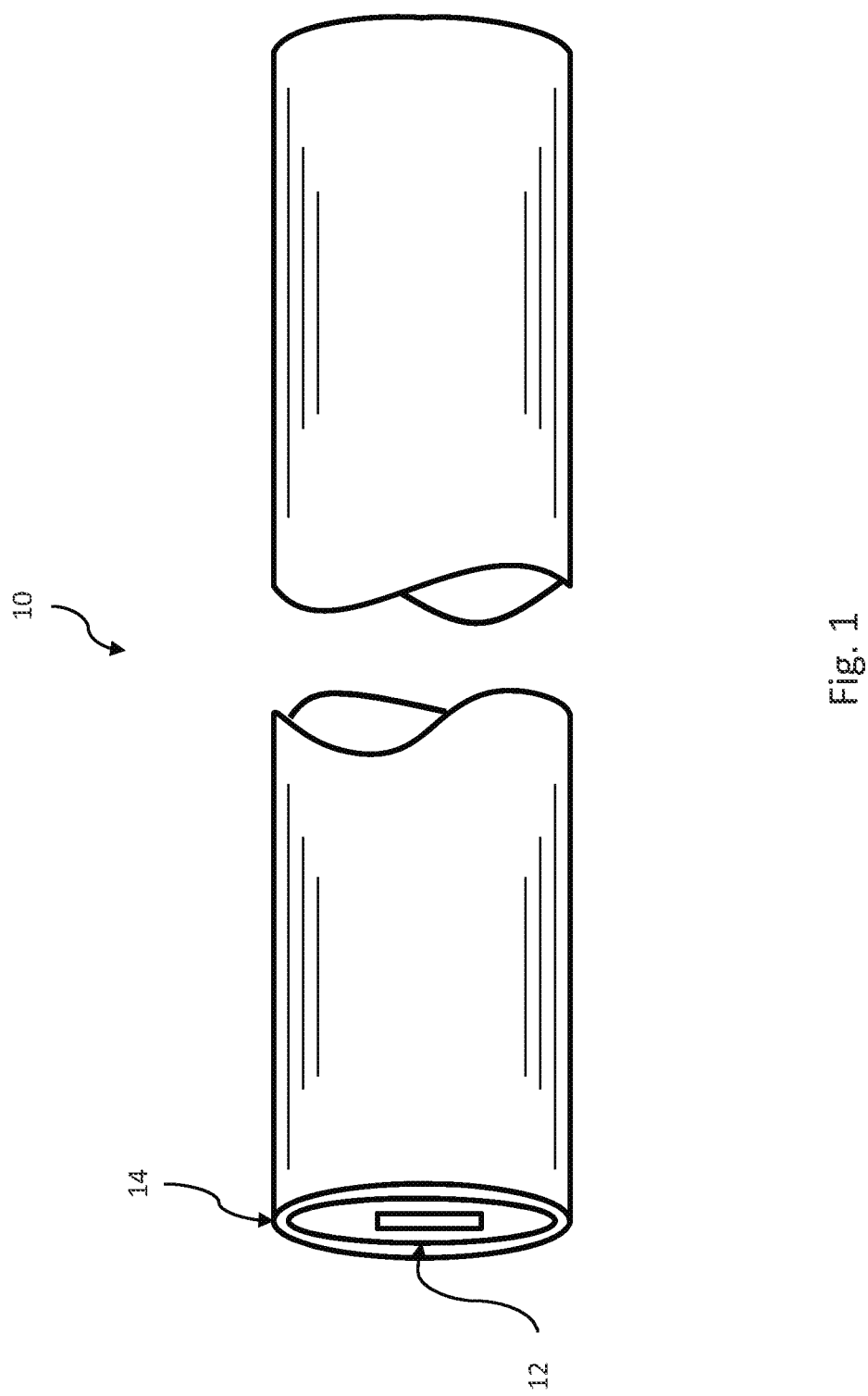
FIG. 1 is a prospective drawing illustrating a structural cylinder having a web shell configured in accordance with one embodiment of the present invention.

As illustrated in FIG. 1, a shell 14 is provided disposed around the core 12 such that a structural unit 10 is formed. In one embodiment, the shell may be configured from tightly wound paper, textile or web. In such an embodiment, the paper textile or web is bonded to the core by so as to improve tensile strength afforded by the column, bolstering its hoop strength.

Figure 2:
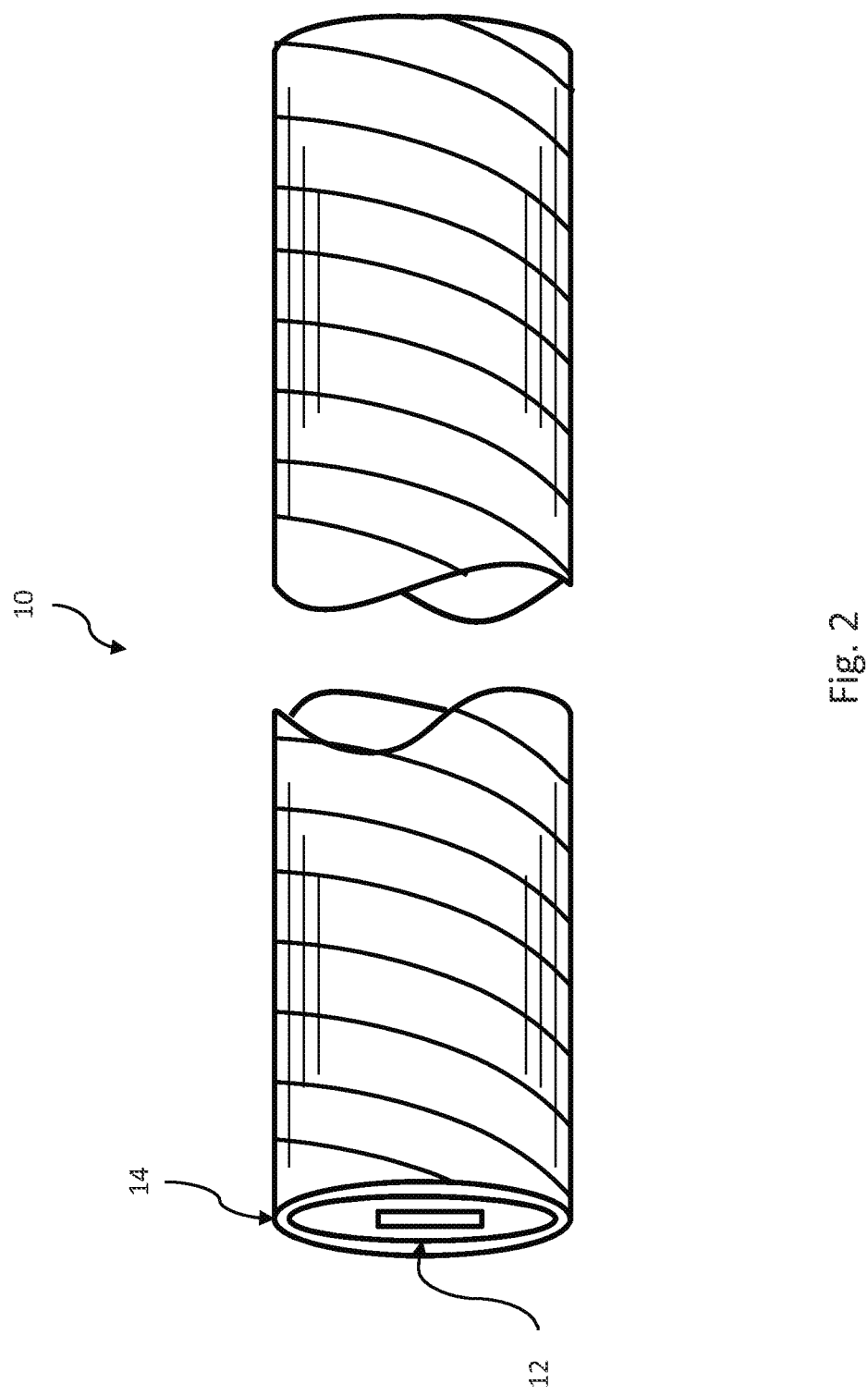
FIG. 2 is a prospective drawing illustrating a structural cylinder having a wound web shell configured in accordance with one embodiment of the present invention.

In one such embodiment, the shell 14 may be configured from gummed tape, with or without fiber reinforcement, wound about a central core 12. Other flexible materials, such as textiles, class fiber may be configured in sheets or tapes and applied to the cores to form a shell. The flexible material may be adhered to the core with adhesives including but not limited to gums, glues, epoxies, or thermo set resins. In embodiments where smoothness is desired, sheets of material of the length of the core may be wound around the core to build up the desired thickness of the shell. Sheets may be shaped to allow for variations in thickness over the profile of the shell 14. Other sheet embodiments may use known sheet winding apparatus and methods to achieve smooth cylindrical profiles. Alternatively, as illustrated in FIG. 2, a narrow tape may be wound continuously around the core, until the desired thickness of shell is achieved. In such an instance, the dimension of the core and the width of the tape may dictate the angle at which the tape may be wrapped upon the core. On one embodiment having a 2.75 inch tape, and a 5 inch core external diameter, the angle of application may be 11 degrees.

One skilled in the art will appreciate that a variety of materials may be used to wrap the core and to form the column. Materials may include paper, textiles, fiber glass, graphite and other composites including but not limited to nanofibers. Materials selected would be applied in a flexible form and would harden in situ once applied to the core. Methods of hardening include but are not limited to thermosetting, drying, epoxide curing, and are determined by the matrix in which the material is embedded.

In alternative embodiments of the present invention, materials disposed about said core may comprise conformable materials applied in sheets, tapes, or in curable liquid form. Such conformable materials comprise rubber, synthetic rubber, silicon based polymers, vinyl, elastic polymers and inelastic polymers. The degree of conformability may be selected based on the intended use of the finished column. Such materials may be used in combination with or replacing paper, textile, composite or fiber wraps.

Figure 3:
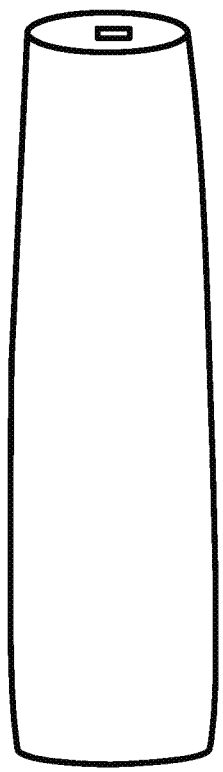
FIG. 3 is a prospective drawing illustrating a structural cylinder having a web shell having a non-cylindrical profile configured in accordance with one embodiment of the present invention.

In one embodiment of the present invention, the extruded core is provided with a coating of paper or other web of material such that it is preferentially built up in portions of the column so as to create a non-uniform coating thickness. In such a way, an embodiment, such as that illustrated in FIG. 3, may be provided wherein a profile analogous to a truncated paraboloid may be provided.

Figure 4:
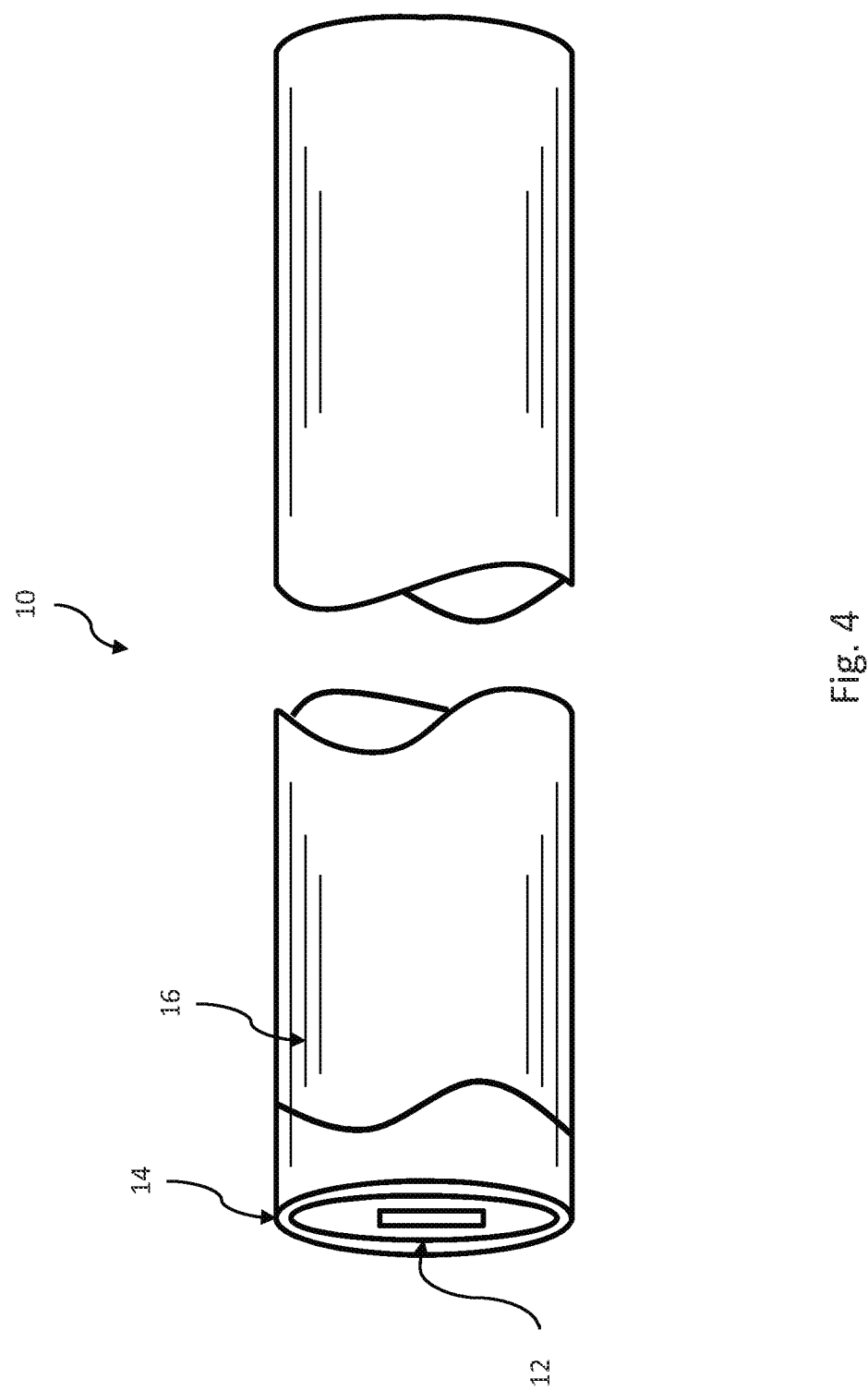
FIG. 4 is a prospective drawing illustrating a structural cylinder having a web shell and finish layer having a non-cylindrical profile configured in accordance with one embodiment of the present invention.

In one embodiment illustrated in FIG. 4, a decorative or aesthetically pleasing finish layer 16 is applied to the column. This finish may included natural or simulated wood veneer, simulated stone veneer, vinyl, textiles, printed or textures papers, or plaster skim coating.

Figure 5:
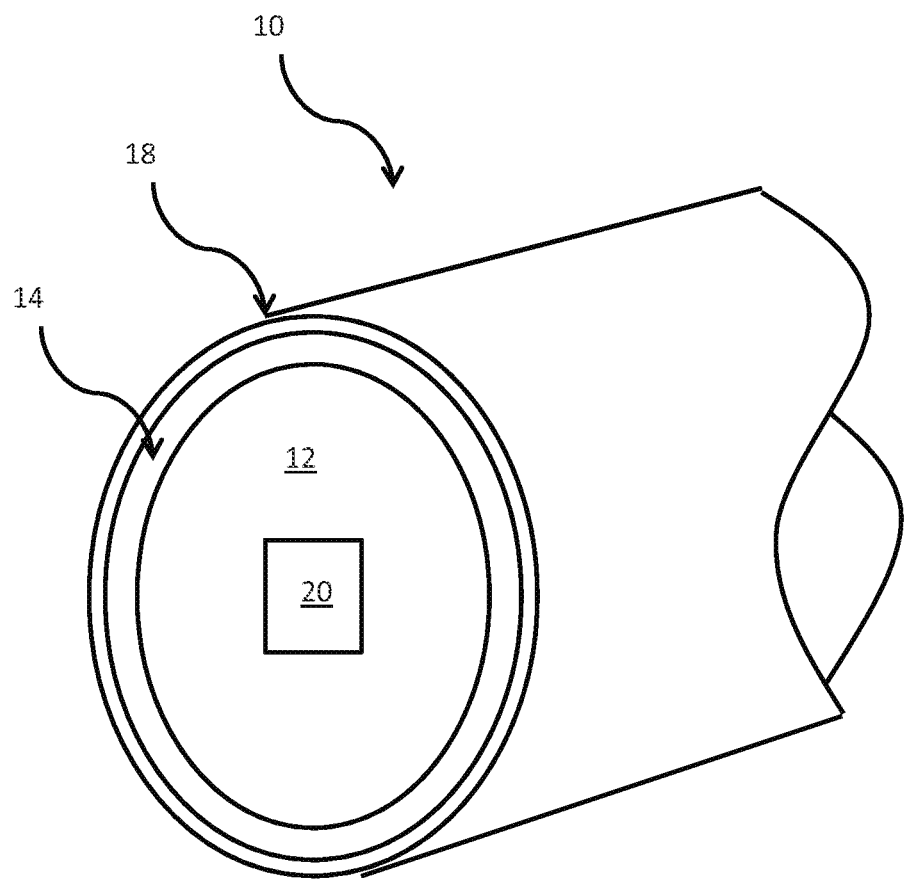
FIG. 5 is a prospective drawing illustrating a structural cylinder having a waterproof layer configured in accordance with one embodiment of the present invention.

As illustrated in FIG. 5, an additional waterproof layer 18 may be applied to the surface of the shell 14 and the core 12. It may be in the form of a water and moisture impermeable barrier material such as plastic film or sheeting wrapped around the structural unit 10, or may be a pre-formed enclosure designed to protect all surfaces of the unit 10, including the central channel 20 through the core 12. Waterproof layers 18 may be configured from heat shrink material or otherwise secured to the exterior if the unit 10. Waterproof layers 18, may in other embodiments comprise coatings of waterproof resins or curable plastic applied in liquid form to the surfaces desired to be protected.

Figure 6:
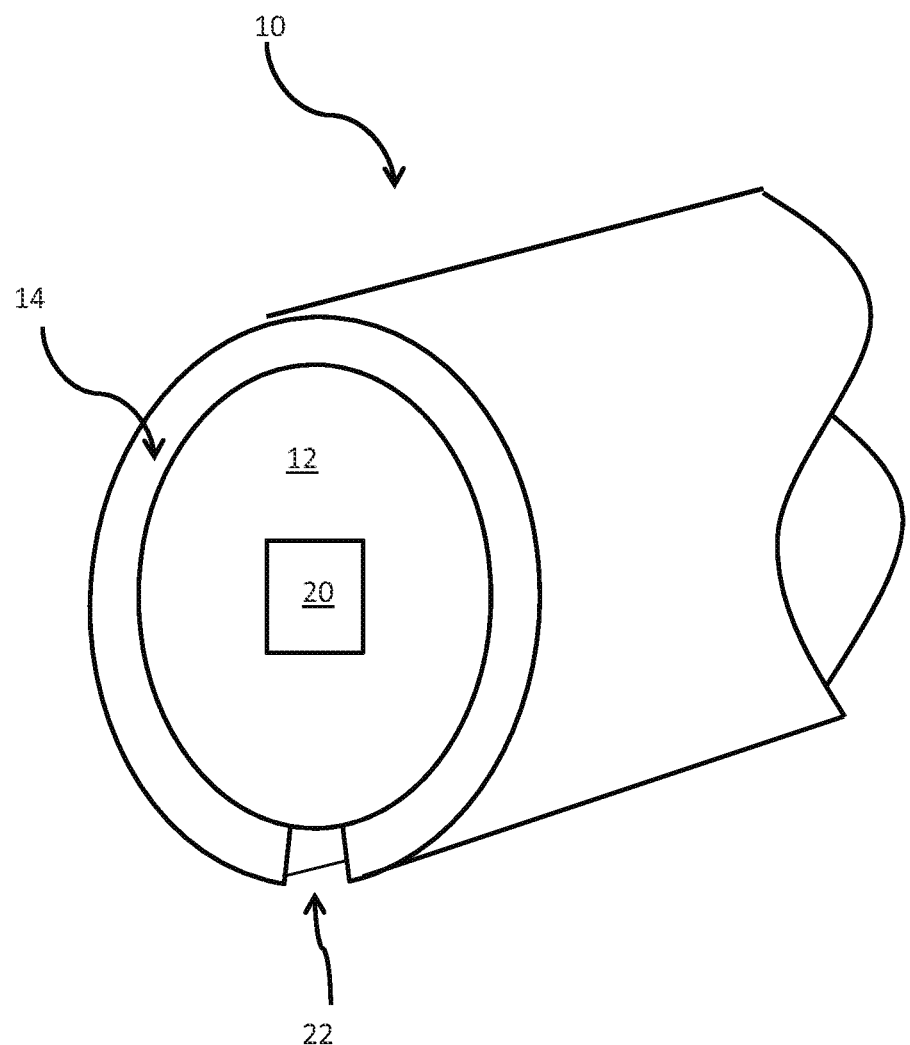
FIG. 6 is a prospective drawing illustrating a structural cylinder having a shell and finish layer having a grove configured in accordance with one embodiment of the present invention.

In one embodiment of the present invention, illustrated in FIG. 6, a channel 22 may be disposed, parallel with the major axis of the unit, and in the shell 14. The channel 22 may either partially or completely transect the shell 14, and is suitable for either the recessing of cables or wiring or for the starting of a belt winding on the unit 10.

Figure 7:
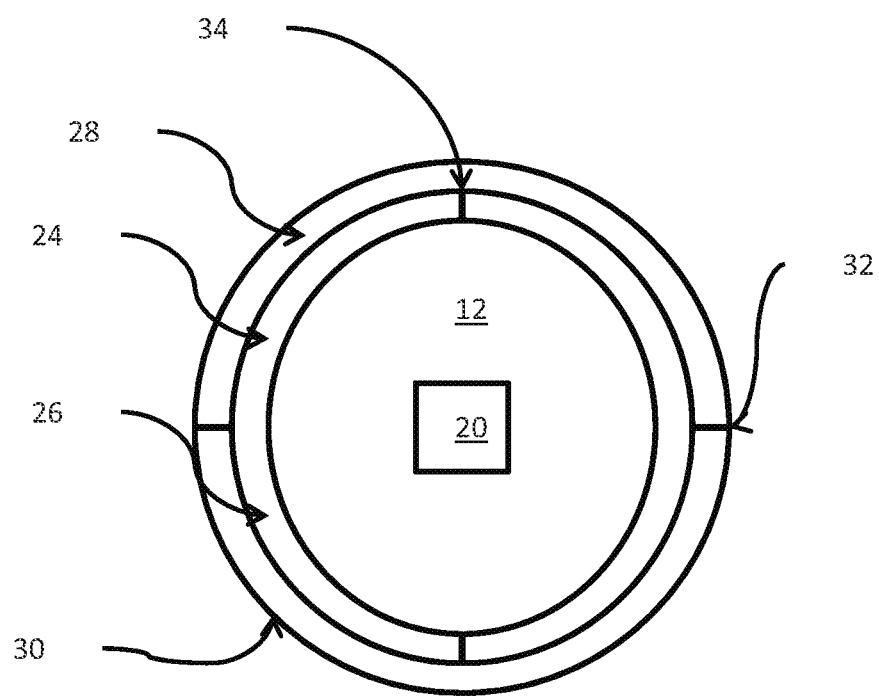
FIG. 7 is a cross sectional elevation drawing illustrating a structural cylinder having a shell layer of split pre-formed tubes configured in accord with one embodiment of the present invention.

As illustrated in FIG. 7, in one embodiment, a preformed tube may be split, the split tube 24 shell may be applied with an adhesive to the exterior if the core 12 in two halves 26. A second tube 28 of slightly larger inside diameter may be applied in a similar fashion to the exterior of the first split tube and glued or otherwise adhered in such a way that the seams 32 formed by the split halves 30 of the second tube 28 are staggered with respect to the seams 34 formed by the two halves 26 of the first tube 24.

Glues used in the adhesion of the papers to the core are chemically and structurally compatible with the resins used in the core. Degradation of the core could compromise strength of the system. Gums typical of those used in adhesive tapes and papers may be used. Alternatively, resins similar to or identical with that used in the wood fiber extrusion may be used. In one such embodiment both the extrusion and the glue are Urea-Formaldehyde resins. The setting of the Urea-Formaldehyde resin may be accelerated using catalysts. Examples of catalysts used include various metal salts, such as aluminum sulfate.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

I claim:

1. A structural unit; said structural unit comprising:
   a extruded core comprising wood fiber and a cured thermoset resin having a central hole coaxial with a major axis of said core and an exterior;
   a plurality of layers of settable material, said settable material being selected from the group consisting of fabric, paper and webbing, forming a shell, disposed about the exterior of said core and a layer of adhesive disposed between said extruded core and said plurality of layers.

2. The structural unit according to claim 1 wherein said settable material is selected from the group of settable materials consisting of coated paper, fiberglass, composites, rubber, synthetic rubber, silicon based polymers, vinyl, elastic polymers, inelastic polymers, and coated textiles.

3. The structural unit according to claim 1 wherein said plurality of layers of settable material comprises overlapping layers of preformed tubular segments and adhesive.

4. The structural unit of claim 1 further comprising a finish layer.

5. The structural unit of claim 4 wherein said finish layer comprises a wood veneer.

6. The structural unit of claim 5 wherein said finish layer comprises a simulated veneer.

7. The structural unit of claim 6 wherein said finish layer comprises a plaster skim coat.

8. The structural unit of claim 4 wherein said finish layer comprises a patterned paper.

9. The structural unit according to claim 1 further comprising a water and moisture impenetrable barrier enlacing said structural unit.

10. The structural unit according to claim 9 wherein said water and moisture impenetrable barrier comprises a heat shrunk polymeric layer.

11. The structural unit according to claim 9 wherein said water and moisture impenetrable barrier comprises a stretch wrap polymeric layer.

* * * * *